United States Patent Office 2,722,559
Patented Nov. 1, 1955

2,722,559

FLUOROCARBON PRODUCTION AT HIGH TEMPERATURES

Mark W. Farlow, Holly Oak, and Earl L. Muetterties, Hockessin, Del., assignors to E. I. du Pont de Nemours & Company, Wilmington, Del., a corporation of Delaware No Drawing. Application April 1, 1954,
Serial No. 420,473

13 Claims. (Cl. 260—653)

This invention relates to a new process for preparing compounds of fluorine and carbon.

Compounds containing only carbon and fluorine (hereinafter referred to as fluorocarbons for the sake of brevity) possess considerable usefulness in many fields of applied chemistry. They have demonstrated utility as dielectrics, intermediates for plastics, refrigerant liquids, ingredients of insecticidal compositions, e. g., as propellants, etc. In particular, tetrafluoroethylene has achieved outstanding commercial success in the form of its polymer.

This invention has as an object the provisions of a new process for the preparation of fluorocarbons. Other objects will appear hereinafter.

These objects are accomplished by the present invention of a process wherein carbon is reacted at a temperature of at least 900° C. with an inorganic ternary oxyfluoride, i. e., a compound composed of three elements, of which one is fluorine, another is oxygen and the third is an inorganic element, preferably an element belonging to groups IV to VII, inclusive, of the periodic table, i. e., an element of groups IV to VII of atomic number of at least 7. Most of the known ternary oxyfluorides are gases under normal conditions, or low boiling liquids, or readily vaporizable solids. The reaction of an organic ternary oxyfluoride, carbon oxyfluoride, with carbon at elevated temperatures to give fluorocarbons is disclosed and claimed in application Ser. No. 420,472, filed by us of even date herewith.

The process of this invention is conveniently carried out by heating an intimate mixture of carbon and the ternary oxyfluoride in a suitably disposed apparatus to a temperature of at least 900° C., and passing the gaseous reaction products through cold condensers to liquefy the fluorocarbons. If desired, a stream of inert gas such as nitrogen is passed through the reactor to help remove the gaseous reaction products. Another mode of operation consists in dropping the oxyfluoride onto finely divided carbon heated to the reaction temperature in a suitable reactor, or subliming or distilling the oxyfluoride over the hot carbon. In still another and preferred embodiment, the ternary oxyfluoride is reacted with the carbon electrodes of a carbon arc, where the temperature is estimated to be in the range of 2500 to 3500–4000° C. for perhaps even higher. This can be done, for example, by immersing the arc in the liquid oxyfluoride, or, when the fluoride is gaseous or readily volatile, by forcing its vapors through the carbon arc, which for this purpose is conveniently designed with one or both of its electrodes hollow.

For practical purposes, a temperature of at least 900° C. is necessary. The reaction temperature can be as high as can practically be obtained by known means. Extremely high temperatures, such as those that can be achieved by use of the carbon arc, represent a desirable embodiment since they often lead to high conversions to the extremely valuable tetrafluoroethylene. With more conventional equipment, temperatures in the range of 1000–2000° C. are preferred.

Any form of carbon, whether amorphous or crystalline, is suitable for the purpose of this invention. Thus, there can be used coal, graphite, charcoal, the various forms of carbon black such as lamp black, acetylene black, gas black, channel black, bone black, etc. At the lower temperatures, e. g., 900–2000° C. the best results are obtained with active carbon, of which many well known varieties are available commercially. In general, active carbon is very finely divided, porous carbon having a total surface area of at least 20 square meters per gram [Hassler, "Active Carbon," Chemical Publishing Co. (1951), page 127]. When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

Inorganic ternary oxyfluorides can be prepared by methods described in the literature, or are available commercially. Many of these oxyfluorides, e. g., the oxyfluorides of phosphorus and sulfur, are obtainable without having to resort to the use of free fluorine, and are therefore relatively low cost materials.

Both reactants, that is the carbon and the inorganic ternary oxyfluoride, should preferably be substantially anhydrous, although the reaction can tolerate the presence of some water. Thus, it is often desirable to dehydrate the carbon prior to reaction, since carbon, especially of the active or absorbent variety, can retain significant amounts of water even at high temperature.

While the relative proportions of the two reactants are not critical insofar as the course of the reaction is concerned, it is desirable for economic reasons to have the carbon present in excess, in order to utilize as much as possible of the more expensive inorganic ternary oxyfluoride. Thus, it is preferred to use the two reactants in such proportions that there is present at least 0.25 gram atom, preferably between 1 and 5 gram atoms, of carbon per gram atom of fluorine. There can be used up to 20 gram atoms of carbon per gram atom of fluorine or even more.

The reaction usually gives a mixture of fluorocarbons, of which the preponderant constituent at the lower reaction temperatures is carbon tetrafluoride, with lesser amounts of other saturated fluorocarbons, e. g., the perfluorinated hydrocarbons from ethane to pentane. When the carbon arc is used, tetrafluoroethylene is often a substantial part, or even the major part, of the reaction product. In addition, the crude reaction product may contain some unreacted oxyfluoride which can be recycled. In some cases at least, the element whose fluoride was employed is liberated in a high state of purity, thus constituting a valuable by-product of the process. The fluorocarbons can be isolated, for example, by passing the gaseous reaction mixture through cold condensers and fractionating the condensate through suitable distilling columns. If desired, the gaseous reaction product can be circulated through cold baffles to retain any material which is solid at that temperature, or it can be passed through liquid scrubbing solutions to separate the unchanged inorganic oxyfluoride and other by-products formed during the reaction. It is usually desirable to effect rapid cooling of the reaction products to avoid side reactions or polymerizations at the high temperatures used. This is particularly the case when very high temperatures, as in the carbon arc, are employed. In such cases, and especially if tetrafluoroethylene is desired as the principal reaction product, very rapid quenching of the reaction mixture is recommended.

The reaction can be carried out at any desired pressure, which is normally the atmospheric pressure but can be higher or lower. Reduced pressures of the order of 1–50 mm. of mercury are preferred when using the electric arc. The reaction is, of course, desirably carried out in an inert atmosphere substantially free from agents, such as oxygen, which would attack the carbon at the operating temperature.

The following examples in which parts are by weight are illustrative of the invention.

*Example I*

A reactor tube lined with a nickel-iron-molybdenum alloy was charged with 46 parts of carbon black and heated at 1000° C. for several hours while a slow stream of nitrogen was passed through it to remove the moisture. A receiver cooled with liquid nitrogen was then attached to the exit end of the reactor and a stream of sulfuryl fluoride ($SO_2F_2$) diluted with three times its volume of nitrogen was passed through the reactor maintained at a temperature of 1000° C. A total of 11 parts of sulfuryl fluoride was subjected to reaction with the carbon. The condensate in the cooled receiver (6 parts) contained 15%, on a molar basis, of carbon tetrafluoride. This can be separated from the remainder of the condensate by fractional distillation.

*Example II*

In this example, sulfuryl fluoride was reacted with the carbon electrodes of a carbon arc as follows: The anode was a solid ⅛ inch graphite cylinder, mounted on a copper tube having perforations near the end holding the anode to permit entrance of the reactant gas in the reaction chamber. The cathode was a hollow graphite cylinder, 5/16 inch outside diameter and 3/16 inch inside diameter, through which the gaseous reaction product escaped and from which it was led to a system of cold condensers. The anode was positioned with its end nearly flush with the open end of the cathode. The electrodes were mounted in a water-cooled, gas-tight glass jacket which was flushed with argon prior to operation and evacuated to a pressure of a few millimeters of mercury.

The arc was operated at a voltage of 27–28 volts and a direct current of 18–20 amperes. The pressure on the inlet side of the arc was 25 mm. and that on the outlet side of the arc 10 mm. A total of 8.8 parts of sulfuryl fluoride was passed through the arc during 10 minutes. There was collected in the cold trap 6.2 parts of condensate, containing, on a molar basis, 10% of carbon tetrafluoride and 10% of hexafluoroethane. This corresponds to a conversion of 37% to fluorocarbons. These can be separated from the condensate by fractional distillation. Free sulfur was also found in the cold trap as a by-product of the reaction.

*Example III*

Phosphorus oxyfluoride ($POF_3$) was reacted with the electrodes of the carbon arc described in Example II. The arc was operated at a voltage of 22–24 volts and a direct current of 18–20 amperes. The pressure on the inlet side was 17 mm. and that on the outlet side 10–12 mm. of mercury. A total of 16.9 parts of phosphorus oxyfluoride was passed through the arc in 25 minutes. The condensate in the cold trap (15.2 parts) contained, on a molar basis, 5% of tetrafluoroethylene, 2% of carbon tetrafluoride and small amounts of hexafluoroethane. This corresponds to a conversion of 10.5% to fluorocarbons. These can be separated from the condensate by fractional distillation. Yellow phosphorus was also found as a by-product of the reaction on the walls of the arc chamber and in the cold trap.

The process of this invention has been exemplified above with certain specific ternary inorganic oxyfluorides but the invention is generic to the reaction of carbon with any inorganic, ternary oxyfluoride, i. e., a ternary oxyfluoride of an inorganic element preferably from groups IV to VII, inclusive, of the periodic table, i. e., a ternary oxyfluoride of an element from groups IV to VII having an atomic number above 6. Other suitable compounds of this class which can be reacted with carbon in the process of this invention include thorium oxyfluoride, $ThOF_2$; uranyl fluoride, $UO_2F_2$; tin oxyfluoride, $SnOF_2$; silicon oxyfluoride, $Si_2OF_6$; nitrosyl fluoride, $NOF$; nitryl fluoride, $NO_2F$; fluorine nitrate, $NO_3F$; bismuth oxyfluoride, $BiOF$; vanadyl fluoride, $VOF_2$; vanadium oxyfluoride, $VOF_3$; thionyl fluoride, $SOF_2$; selenium oxyfluoride, $SeOF_2$; chromyl fluoride, $CrO_2F_2$; the molybdenum oxyfluorides, $MoO_2F_2$ and $MoOF_4$; tungsten oxyfluoride, $WO_2F_2$; iodine oxyfluoride, $IOF_3$; and the rhenium oxyfluorides, $ReOF_4$ and $ReO_2F_2$. The most useful of these ternary oxyfluorides are the oxyfluorides of elements of groups V and VI, and particularly of groups V–A and VI–A (Deming, General Chemistry, Wiley, 1944) because these oxyfluorides are gaseous and therefore well suited for the purpose of this invention, and because many of them can be prepared inexpensively. Within this more restricted group, the preferred oxyfluorides are nitrosyl fluoride, $NOF$; nitryl fluoride, $NO_2F$; phosphorus oxyfluoride, $POF_3$; thionyl fluoride, $SOF_2$; and sulfuryl fluoride, $SO_2F_2$.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Process for the production of fluorocarbons wherein carbon is reacted at a temperature of at least 900° C. with an inorganic ternary oxyfluoride.

2. The process for the production of fluorocarbons which comprises reacting sulfuryl fluoride with carbon at a temperature of at least 900° C.

3. The process for the production of fluorocarbons which comprises reacting phosphorus oxyfluoride with carbon at a temperature of at least 900° C.

4. The process for the production of fluorocarbons which comprises reacting carbon with a ternary inorganic oxyfluoride at a temperature of at least 900° C.

5. The process for the production of fluorocarbons which comprises reacting carbon with a ternary oxyfluoride of an inorganic element from groups IV to VII of the periodic system and of atomic number of at least 7 at a temperature of at least 900° C.

6. The process for the production of fluorocarbons which comprises reacting carbon with a normally gaseous ternary inorganic oxyfluoride of an element of group V–A of the periodic system at a temperature of at least 900° C.

7. The process for the production of fluorocarbons which comprises reacting carbon with a normally gaseous ternary inorganic oxyfluoride of an element of group VI–A of the periodic system at a temperature of at least 900° C.

8. The process for the production of fluorocarbons wherein carbon is reacted at carbon arc temperature with an inorganic ternary oxyfluoride.

9. The process for the production of fluorocarbons wherein an inorganic ternary oxyfluoride is reacted with the carbon of a carbon arc.

10. The process for the production of fluorocarbons wherein carbon is reacted at carbon arc temperature with sulfuryl fluoride.

11. The process for the production of fluorocarbons wherein sulfuryl fluoride is reacted with the carbon of a carbon arc.

12. The process for the production of tetrafluoroethylene which comprises reacting carbon with a ternary inorganic oxyfluoride at a temperature of at least 2500° C.

13. The process for the production of tetrafluoroethylene which comprises reacting carbon with a ternary inorganic oxyfluoride at a temperature of at least 2500° C. and very rapidly quenching the reaction products.

References Cited in the file of this patent

UNITED STATES PATENTS

| | | |
|---|---|---|
| 1,933,166 | Daudt et al. | Oct. 31, 1933 |
| 2,684,987 | Mantell et al. | July 27, 1954 |

OTHER REFERENCES

Jour. Ind. and Eng. Chem., vol. 42, No. 11, Nov. 1950, page 2225.

Moeller, "Inorganic Chemistry," Wiley and Sons (1952), New York City, N. Y., page 523.